V. G. DARTOIS.
MACHINE FOR CUTTING BEVEL GEAR WHEELS WITH HELICAL OR STRAIGHT TEETH.
APPLICATION FILED NOV. 13, 1920.
1,426,278.
Patented Aug. 15, 1922.
2 SHEETS—SHEET 1.
Fig. 1.
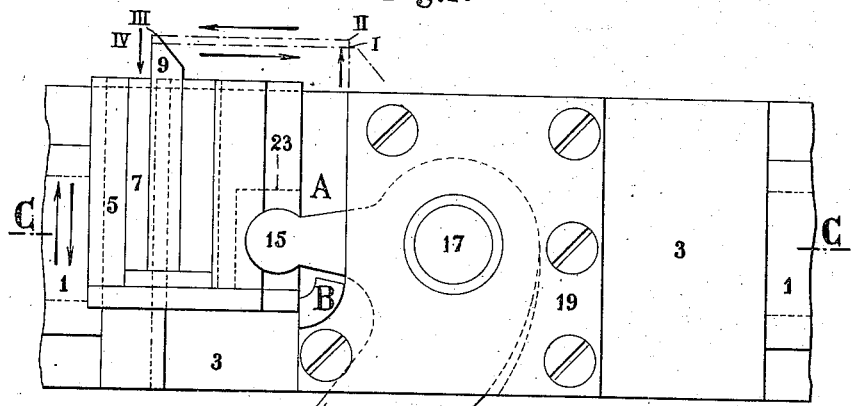
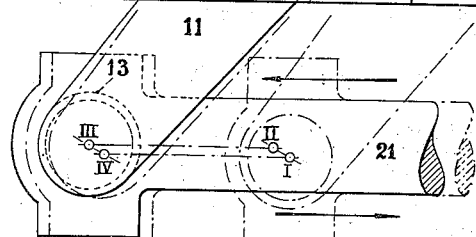
Fig. 3.
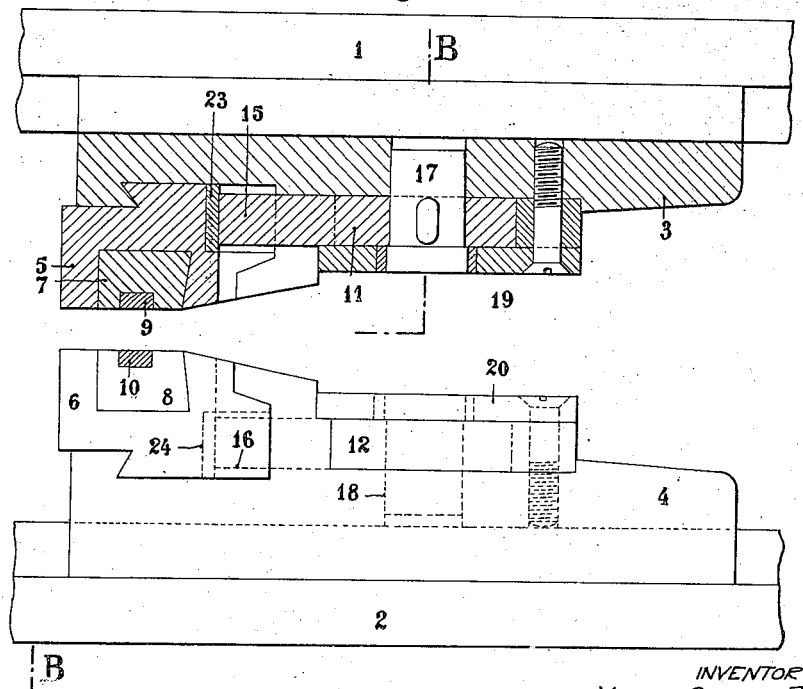
INVENTOR
VICTOR GASPARD DARTOIS
BY Munn & Co.
ATTORNEYS

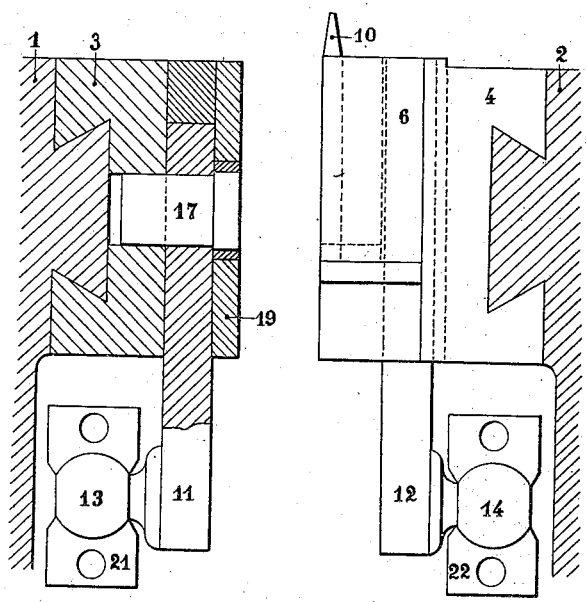

UNITED STATES PATENT OFFICE.

VICTOR GASPARD DARTOIS, OF PARIS, FRANCE.

MACHINE FOR CUTTING BEVEL-GEAR WHEELS WITH HELICAL OR STRAIGHT TEETH.

1,426,278. Specification of Letters Patent. Patented Aug. 15, 1922.

Application filed November 13, 1920. Serial No. 423,897.

*To all whom it may concern:*

Be it known that I, VICTOR GASPARD DARTOIS, of 4 Boulevard Malesherbes, Paris, France, manufacturer, have invented a Machine for Cutting Bevel-Gear Wheels with Helical or Straight Teeth, of which the following is a full, clear, and exact description.

In the United States patent application, filed on January 19th 1920, S$^{al}$ No. 352343, a machine for cutting bevel gear wheels with helical or straight teeth has been described and illustrated; in this machine the tool-holder is pivoted about a horizontal axis and raised by a spring or a weight against the bearing surface provided in the carriage, in such a manner that, during the return stroke, the tool is withdrawn to a very small extent and that its edge grazes the surface to be worked. This arrangement, used for the tool-holders of planing machines, can give satisfaction when the tool has rectilinear movement in the space as for cutting straight teeth, but can present inconveniences when this movement is curvilinear, as when cutting helical teeth, because the rotation of the tool-holder about a horizontal axis may cause its cutting edge to describe an arc tending, not to move it away from the surface to be worked, but to wedge it therein.

This invention has for its object a driving device for the tool-holder, devised in such a manner as to remedy the above mentioned inconveniences.

This device is characterized by the fact that the planing tools are spaced from the surface to be worked by a displacement at right angles to the said surface, displacement which is obtained by a bent lever having a limited angular stroke and controlled by the main driving link, which cannot drive the tools in their return stroke before spacing them from the said surface, nor drive them in their forward stroke without having determined the restoration of their adjustment in depth.

A form of construction of the tool-holder with spacing movement forming the subject-matter of the present invention will be described in detail hereafter with reference to the accompanying drawing and as applied to the machine for cutting gear wheels with helical teeth described in the United States patent application Sal. No. 352343.

In this drawing,

Fig. 1 is a side elevation of one of the holders.

Fig. 2 is a cross vertical section made according to line B—B of Fig. 3, showing one of the carriages in section and the other in end view.

Fig. 3 illustrates one of the carriages in horizontal section one line C—C of Fig. 1 and the second carriage in plan view.

The device for spacing the tools from the surface to be worked, during their return stroke; comprises in the example shown in the drawing:

(*a*) Two fixed carriage-guides 1 and 2, integral with the cradle or saddle of the machine for cutting toothed wheels;

(*b*) Two carriages 3 and 4 movable along these guides under the action of an outer drive, with a horizontal movement;

(*c*) Two vertical carriages 5 and 6 having, relatively to the carriages 3 and 4, a vertical movement of small extent; these carriages receive the tool-holders proper 7 and 8 which are secured thereto by screws;

(*d*) Two tools 9 and 10 which are secured, by a suitable clamping device, in these tool-holders 7 and 8.

The two carriages 3 and 4 each carry respectively a bent lever 11 or 12 provided with a spherical ball 13 or 14 at one of its ends and with a cylindrical member 15 or 16 at its other end; each of the levers 11 and 12 carries, moreover, a trunnion 17 or 18 serving as rocking axis for each of the said levers and which is pivoted, for that purpose, on the corresponding carriages 3 or 4 and on a plate 19 or 20 secured on the respective carriage 3 or 4.

Each spherical ball 13 or 14 is respectively controlled by a link receiving its horizontal reciprocating movement from a crank or an eccentric, either directly or through the medium of transmission members; the stroke of the said links can be varied by modifying the eccentricity.

Each of the cylindrical members 15 or 16 is mounted within a cubic bronze box 23 or 24 having an inner cylindrical bore; each box is adjusted in a vertical recess respectively provided in the carriages 5 and 6, but is capable of a slight horizontal movement in its recess.

The rotation of each of the bent levers 11 and 12 about their respective axis 17 and 18 is limited to the required extent, at A and B, by projections on each carriage 3 and 4, which leave between them a gap a little larger than the dimensions of the levers 11 and 12 in the same region.

The operation of this device is as follows:

Fig. 1 illustrates the carriage 3 and the tool 9 at the end of their forward stroke (position III); the second tool 10 obviously occupies the same position. From this moment, the links 21 and 22 respectively controlling the carriages 3 and 4, begin their return movement, but they do not at first drive along the said carriages 3 and 4, because instead of being directly attached thereto, they each drive the corresponding bent lever 11 or 12; the latter pivot therefore respectively about their trunnion 17 or 18, until they abut at B. In this first period (from the position III to the position IV), the carriages 5 and 6 move downwards on their respective carriage 3 and 4, so that the point of the tools are vertically withdrawn according to a corresponding extent.

When the levers 11 and 12 abut at B their subsequent rotation about their respective trunnion 17 and 18 is prevented. As the return stroke of the links 21 and 22 proceeds, they act as if they were directly attached to their carriage 3 and 4 which then move horizontally towards the left.

When the links are at the end of their return stroke (position 1) and that their forward movement begins, they cannot at first drive their carriage 3 and 4, the inertia of which is greater than that of the system 5—6, 7—8 and 9—10, so that the first effect of this forward movement of the links is to cause the levers 11 and 12 to rotate about their trunnion, until they abut at A. The levers when abutting at A cause the tools to come back to their cutting position (position II) and as the forward stroke of the links proceeds, the carriages 3 and 4 are then driven along and the tools described a horizontal movement from II to III.

A rectangular trajectory I, II, III, IV is thus obtained for these tools, in which II, III is the forward stroke; III, IV the stroke spacing them from the work; IV, I the return stroke and I, II the stroke suppressing the spacing stroke. During this time, the balls 13 and 14 and the links 21 and 22 describe a parallelogram I, II, III, IV, the sides II, III and IV, I of which are rectilinear and the sides III, IV and II, I are arcs respectively described about each pivot 17 and 18; the total stroke of the links 21 and 22 is therefore the projection of the interval I, III which is slightly greater than the stroke II, III or IV—I of the tools.

It results from the foregoing that the spacing movement of the tools is at right angles to the forward and return movement, so that, whatever may be the curvilinear trajectory of the said tools in the space (in the case of the machine described in the United States patent application S$^{al}$ No. 352343, this curvilinear trajectory results from the combination of the curvilinear movement of the carriages 3 and 4 on the guides 1 and 2 of the cradle or saddle, with the rotary movement of the cradle about a vertical axis), these tools can, in no case whatever, neither in the spacing movement, nor in the return stroke, wedge against the surface already worked, as this might happen with the ordinary spacing device.

Moreover, with this device, the spacing stroke III, IV can be chosen, in such a manner that, during the return stroke, the tools do not even touch the surfaces, either already worked or to be worked, since this stroke, as small as it may be result from a mechanical movement taken on their driving movement, whilst with the usual system, the spacing results from the friction of the point of the tools on the surface to be worked or already worked.

The above described spacing device may obviously be applied to a single carriage, as in the shapers and in the planing machines for instance.

It will be therefore understood that this device may also be used in the case of a tool describing a rectilinear trajectory in the space, since it allows of avoiding any friction of the point on the return stroke, of preventing the wear resulting therefrom and of permitting the use of return speeds as great as allowed by the inertia of the parts in movement.

The above described arrangements are of course given by way of example only; the forms, materials and dimensions of the various constituent parts can be varied without departing thereby from the principle of the invention.

Claims—

1. A device producing the spacing of the planing tools of a machine for cutting gear wheels or other machine-tool, comprising: a fixed carriage-guide—a horizontal carriage longitudinally movable on the said guide,—a vertical carriage mounted in the horizontal carriage,—a tool-holder secured in the said vertical carriage,—a bent lever having a limited angular stroke, mounted on the horizontal carriage and connected by one of its arms to the vertical carriage and by the other arm to the driving link producing the rectilinear displacement of the horizontal carriage on the fixed guide,—means for producing the vertical displacement of the vertical carriage and of the tool at the beginning of the return stroke and at the beginning of the forward stroke of the horizontal carriage.

2. A device producing the spacing of the planing tools of a machine for cutting gear wheels or other machine-tools, comprising: a fixed carriage-guide,—a horizontal carriage longitudinally movable on the said guide,— a vertical carriage mounted in the horizontal carriage,—a tool-holder secured in the said vertical carriage,—a bent lever mounted on the horizontal carriage and rocking on the latter between two fixed abutments, the said bent lever being connected by one of its arms to the vertical carriage carrying the tool and by the other arm to the driving link producing the rectilinear displacement on the fixed guide of the whole formed by the horizontal carriage, the vertical carriage and the tool, after having determined the rocking of the bent lever and, consequently, the vertical displacement of the tool, in the direction removing it from the surface to the work during the return stroke and in the direction bringing him towards the said surface during the forward stroke.

The foregoing specification of my "machine for cutting bevel gear wheels with helical or straight teeth," signed by me this 28th day of October, 1920.

VICTOR GASPARD DARTOIS.